United States Patent
Wu et al.

(10) Patent No.: US 7,292,653 B2
(45) Date of Patent: Nov. 6, 2007

(54) CARRIER LOCK DETECTOR

(75) Inventors: Kuang Tsan Wu, Kanata (CA); Han Sun, Nepean (CA); John McNicol, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 693 days.

(21) Appl. No.: 10/796,152

(22) Filed: Mar. 10, 2004

(65) Prior Publication Data

US 2005/0201492 A1 Sep. 15, 2005

(51) Int. Cl.
*H04L 27/00* (2006.01)
*H04L 27/22* (2006.01)
*H04L 27/06* (2006.01)
(52) U.S. Cl. .................. 375/326; 375/332; 375/340
(58) Field of Classification Search ............ 375/316, 375/324, 326, 340, 279–281, 329, 332; 329/304, 329/306, 308, 309
See application file for complete search history.

(56) References Cited

U.S. PATENT DOCUMENTS

| 4,736,386 A | * | 4/1988 | Nichols ............. 375/224 |
| 4,987,375 A | * | 1/1991 | Wu et al. ........... 329/309 |
| 5,363,408 A | * | 11/1994 | Paik et al. ......... 375/261 |
| 5,519,356 A | * | 5/1996 | Greenberg .......... 329/304 |
| 5,533,059 A | * | 7/1996 | Tsuda .............. 375/327 |

* cited by examiner

*Primary Examiner*—Tesfaldet Bocure
(74) *Attorney, Agent, or Firm*—Kent Daniels; Ogilvy Renault LLP (57) ABSTRACT

A carrier lock detector for a QPSK or 4-QAM system implements a lock detection algorithm that maps detected signals onto one of first and second areas associated with nominal states defined by $(I_2 \oplus I_3) \cdot (Q_2 \oplus Q_3)$ and $\overline{Q_1 \oplus Q_2} \cdot (I_1 \overline{I_2 I_3} + \overline{I_1} I_2 I_3) + (\overline{I_1 \oplus I_2}) \cdot (Q_1 \overline{Q_2 Q_3} + \overline{Q_1} Q_2 Q_3)$, or alternatively, by $(\overline{I_1 \oplus I_2} \cdot Q_2 \oplus Q_3) + (\overline{Q_1 \oplus Q_2} \cdot I_2 \oplus I_3)$, respectively. When detected signals map onto one of the first areas, a first signal is generated. When detected signals map onto one of the second areas, a second signal is generated. When a difference between the first and second signals exceeds a threshold, a carrier lock detection signal is generated to enable a decoder. The carrier lock detector is able to detect carrier lock at a raw BER of 1e-2 or greater at a very low signal-to-noise ratio.

15 Claims, 10 Drawing Sheets

CARRIER LOCK DETECTOR

CROSS-REFERENCE TO RELATED APPLICATIONS

This is the first application filed for the present invention.

MICROFICHE APPENDIX

Not Applicable.

TECHNICAL FIELD

The present invention relates in general to carrier recovery in digital communication systems, and in particular to coherent receivers having carrier lock detectors.

BACKGROUND OF THE INVENTION

Digital communication systems modulate an electromagnetic carrier signal to convey binary information from a transmitter to a receiver. Two well-known digital modulation techniques are QAM (Quadrature Amplitude Modulation) and QPSK (Quadrature Phase Shift Keying). Both QAM and QPSK are forms of I/Q Modulation because both of these modulation techniques compose a signal from two independent components: an in-phase component (I) and a quadrature component (Q). Since the in-phase and quadrature components are orthogonal to each other, they do not interfere with each other during transmission. The I and Q components are represented graphically by plotting I and Q on a plane Cartesian coordinate system, known as a phasor diagram, in which the I value is conventionally the abscissa while the Q value is the ordinate.

Demodulation of the in-phase and quadrature components of the received signal recovers the I bits and Q bits, respectively. When plotted on the phasor diagram, the signals form an I/Q constellation, or a signal point constellation. For good reception, the signal points should cluster tightly around discrete points, or "nominal states", which are then readily demodulated into binary 1's and binary 0's. When the signal points cluster tightly around the nominal states, the carrier is said to be locked.

A coherent receiver, such as an optical coherent receiver, must be locked, or "in lock", to ensure that binary data is received at a minimal rate of error, usually expressed in terms of bit-error rate, or BER. Bit-error rate is customarily defined as the average probability that the receiver will incorrectly identify a bit. Raw BER is BER before decoding by FEC (forward error correction). With the use of powerful FEC, the BER can be reduced by many orders of magnitude compared to the raw BER.

A carrier can go "out of lock" when severe distortion occurs. For an optical coherent receiver, distortion may occur because of PMD (Polarization-Mode Dispersion), PDL (Polarization Dependent Loss), ASE (Amplified Spontaneous Emission) or any combination thereof.

In communication systems using QAM or QPSK, carrier lock is necessary to permit accurate decoding of the signals and recovery of the baseband I and Q bits. In other words, to enable the modulated signals to be correctly decoded, the phase and frequency of the receiver LO (local oscillator) must be locked to the incoming carrier.

In microwave communication systems, fading is a common and well-known phenomenon. During a fade, the signal-to-noise ratio (SNR) of the received signal falls to a low level, such that the signal and/or carrier lock may be lost. At the end of a fade, carrier lock must first be established before the signal can be correctly decoded. A carrier lock detector is used to detect whether the carrier is locked or unlocked. The carrier lock detector enables the decoder only when carrier lock is detected.

It is desirable to maintain carrier lock, and to detect carrier lock with a high degree of reliability, at the lowest possible levels of SNR, so that the system can tolerate deep fades with minimal loss of decoded data.

U.S. Pat. No. 4,736,386 (Nichols) entitled CARRIER OUT-OF-LOCK DETECTOR APPARATUS teaches a carrier lock detector which is responsive to I and Q (in-phase and quadrature) amplitude error bits to provide an out-of-lock indication when, on average, more than half of the detected I and Q amplitudes are in error. During an out-of-lock condition the detected signal point positions rotate about the I and Q axes of the phase plane diagram, the rate of rotation of the detected signal point positions being dependent upon the carrier phase error.

A disadvantage of this known carrier lock detector is that, at low levels of SNR during fading, it can indicate an out-of-lock condition even though the carrier is still locked. For example, for a 512-QAM system such a known detector fails to operate correctly for a SNR of less than about 29 dB, whereas it is desirable to have a detector which operates correctly at lower levels of SNR, for example down to about 25 dB.

Figure 1:
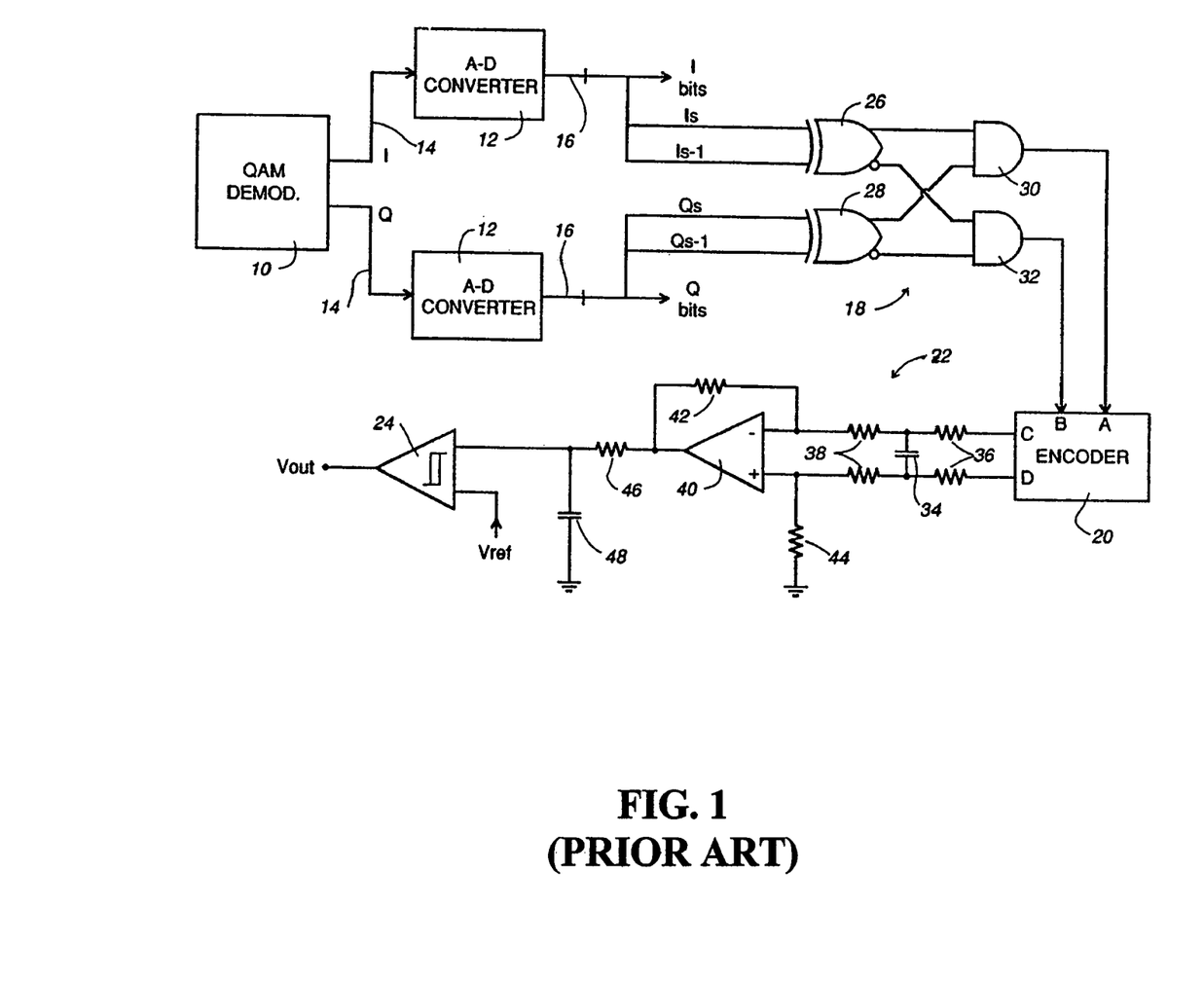
FIG. 1 is a circuit diagram of a prior-art carrier lock detector for a QAM system.

An improved carrier lock detector is disclosed in U.S. Pat. No. 4,987,375 entitled CARRIER LOCK DETECTOR FOR A QAM SYSTEM (Wu et al.), illustrated in FIG. 1. As shown in FIG. 1, the carrier lock detector includes a QAM demodulator 10, which splits the signal into analog I and Q components on respective output lines 14. A pair of analog-to-digital converters (ADC) 12 convert the analog I and Q components into I bits and Q bits on lines 16. The carrier lock detector further includes a gating circuit 18, an encoder 20, an integrating circuit 22, and a comparator 24. The gating circuit 18 has two EXCLUSIVE-OR gates 26 and 28 as well as two AND gates 30 and 32. The integrating circuit 22 includes an integrating capacitor 34 coupled via resistors 36 to the outputs of the encoder 20 and via resistors 38 to the differential inputs of a differential amplifier 40, having a negative feedback resistor 42 and a resistor 44 between its non-inverting input and ground, and having a smoothing circuit with a resistor 46 and a capacitor 48 coupled to its output. The resistors 42 and 44 have the same resistance, and the resistors 36, 38 each have half that resistance. The comparator 24 compares the smoothed output of the integrating circuit 22 with a reference voltage $V_{ref}$ to produce an output $V_{out}$ which constitutes a carrier lock detection signal.

Figure 2:
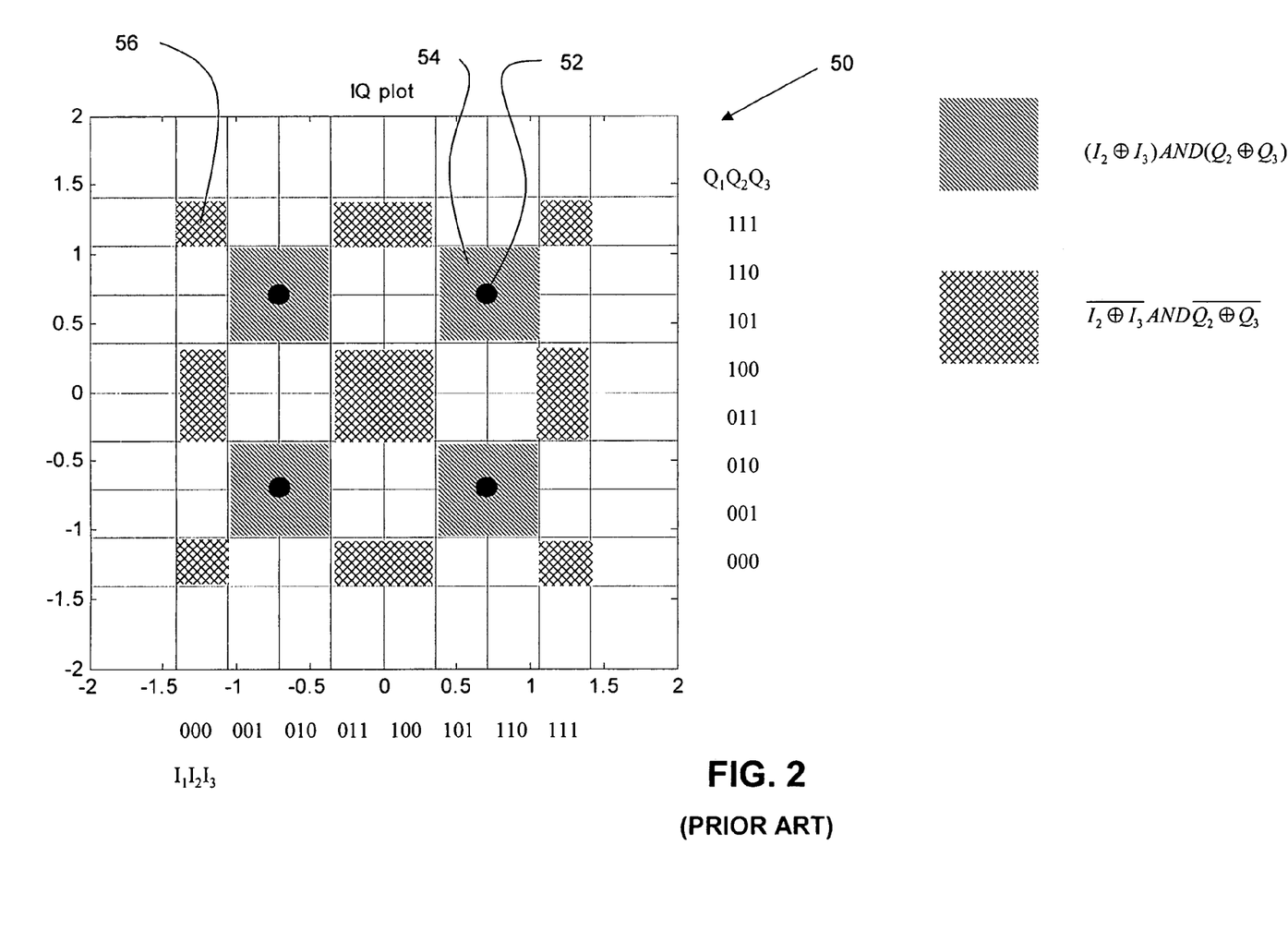
FIG. 2 is an I/Q plot of a prior-art lock detection algorithm implemented on a QPSK or 4-QAM system.

FIG. 2 shows an I/Q plot 50 of a prior-art lock detection algorithm implemented on a QPSK or 4-QAM system. Centered about four nominal states 52 are four first areas 54 defined by $(I_2 \oplus I_3) \cdot (Q_2 \oplus Q_3)$. Adjacent to the first areas are second areas 56 defined by $\overline{I_2 \oplus I_3} \cdot \overline{Q_2 \oplus Q_3}$. If a detected signal has I and Q components that map onto one of the four areas 54 surrounding the nominal states 52, a first signal is generated. If the detected signal has I and Q components that map onto one of the second areas 56, then a second signal is generated. The difference between the first and second signals is compared with a threshold value. If the difference exceeds the threshold, then a carrier lock detection signal is generated.

Although the carrier lock detector described by Wu et al. worked well for large constellations, such as 16-QAM to 512-QAM, for lower-level QAM such as 4-QAM or for QPSK, the method and apparatus described by Wu et al. is not effective. In light of the very important optical applications such as 2-pol QPSK, due to the effect of laser linewidth and other distortions such as PMD and PDL and the use of powerful FEC, there is a need-for a much more robust carrier lock detector that can operate at raw BER of 1e-2 or higher. Furthermore, due to the high speed of optical modems (circa 10 GBaud), it is highly desirable that the hardware implementation of this carrier lock detector be simple.

SUMMARY OF THE INVENTION

Accordingly, an object of the present-invention is to provide a carrier lock detector that will overcome at least some of the deficiencies described above.

Thus, the present invention provides a carrier lock detector for use with a QPSK or low-level QAM system having a constellation of signal points identified by a plurality of I bits and Q bits respectively representing in-phase and quadrature components in a phasor diagram, the phasor diagram including a plurality of first areas centered on ideal signal points representing nominal states and a plurality of second areas adjacent to the first areas. The detector includes a first counter responsive to a plurality of I bits and Q bits, the first counter producing a first output signal when a detected signal has I and Q components that map onto one of the first areas; a second counter responsive to a plurality of I bits and Q bits, the second counter producing a second output signal when a detected signal has I and Q components that map onto one of the second areas; and a logic device for computing a difference between the first output signal and the second output signal and for generating a carrier lock detection signal when the difference between the first output signal and the second output signal exceeds a threshold probability.

Another aspect of the present invention provides a coherent receiver having a local oscillator for generating a local signal having a local frequency different from that of an incoming signal; a coupler for combining the incoming signal with the local signal to produce an intermediate signal; a detector for detecting the intermediate signal; a filter for filtering the intermediate signal; a demodulator for separating the intermediate signal into analog I and Q components; a first analog-to-digital converter for converting the analog I components into I bits; a second analog-to-digital converter for converting the analog Q components into Q bits; and a carrier lock detector having the features described above.

Yet another aspect of the present invention provides a method of detecting carrier lock in a QPSK or low-level QAM system having a constellation of signal points identified by a plurality of I bits and Q bits respectively representing in-phase and quadrature components in a phasor diagram, the phasor diagram including a plurality of first areas centered on ideal signal points representing nominal states and a plurality of second areas adjacent to the first areas. The method includes the steps of: generating a first signal when a detected incoming signal has I and Q components that map onto one of the first areas; generating a second signal when a detected incoming signal has I and Q components that map onto one of the second areas; computing a difference between the first signal and the second signal; comparing the difference with a threshold value; and generating a carrier lock detection signal when the difference exceeds the threshold.

In embodiments of the invention, the first areas and the second areas are defined in terms of $I_1$, $I_2$, $I_3$ and $Q_1$, $Q_2$, $Q_3$.

A first algorithm defines the first areas by $(I_2 \oplus I_3) \cdot (Q_2 \oplus Q_3)$ and the second areas by $\overline{Q_1 \oplus Q_2} \cdot (I_1 \overline{I_2 I_3} + \overline{I_1} I_2 I_3) + (\overline{I_1 \oplus I_2}) \cdot (Q_1 \overline{Q_2 Q_3} + \overline{Q_1} Q_2 Q_3)$. A second algorithm defines the first areas by $(I_2 \oplus I_3) \cdot (Q_2 \oplus Q_3)$ and the second areas by $(\overline{I_1 \oplus I_2} \cdot \overline{Q_2 \oplus Q_3}) + (\overline{Q_1 \oplus Q_2} \cdot \overline{I_2 \oplus I_3})$.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a carrier lock detector for QPSK or 4-QAM. A carrier lock detector for a QPSK or 4-QAM system implements a lock detection algorithm in which I and Q components are mapped onto a phasor diagram. First areas are defined to be centered about nominal states whereas second areas are defined adjacent to the first areas. When detected signals map onto one of the first areas, a first signal is generated. When detected signals map onto one of the second areas, a second signal is generated. When the difference between the first and second signals exceeds a threshold, a carrier lock detection signal is generated to enable a decoder. The first areas are defined by $(I_2 \oplus I_3) \cdot (Q_2 \oplus Q_3)$. The second areas are defined by $\overline{Q_1 \oplus Q_2} \cdot (I_1 \overline{I_2} \overline{I_3} + \overline{I_1} I_2 I_3) + (\overline{I_1 \oplus I_2}) \cdot (Q_1 \overline{Q_2 Q_3} + \overline{Q_1} Q_2 Q_3)$, or alternatively, by $(\overline{I_1 \oplus I_2} \cdot Q_2 \oplus Q_3) + (\overline{Q_1 \oplus Q_2} \cdot I_2 \oplus I_3)$. The carrier lock detector is able to detect carrier lock or carrier spinning at raw BER of 1e-2 or greater at very low SNR.

The first and second areas are defined to optimize the likelihood that carrier lock or unlock will be accurately detected. The choice of first and second areas was based on observations of QPSK constellations for carrier locked/spinning conditions and for both high and low signal-to-noise ratios.

FIGS. 3 to 6 represent four signal point constellations (also known as "I/Q plots") showing the typical scatter of signal points depending on whether the carrier is locked or unlocked and whether the signal-to-noise ratio is high or low.

Figure 3:
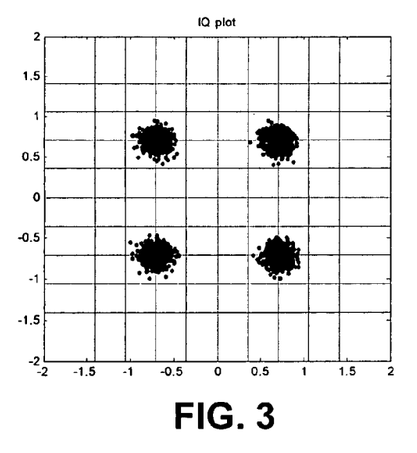
FIG. 3 is an observed signal point constellation for QPSK plotted on an I/Q phasor diagram showing carrier lock at high SNR.

FIG. 3 is a signal point constellation plotted on an I/Q phasor diagram showing carrier lock at high SNR. When the carrier is locked at high SNR, the signal points are tightly clustered around each of the respective nominal states.

Figure 4:
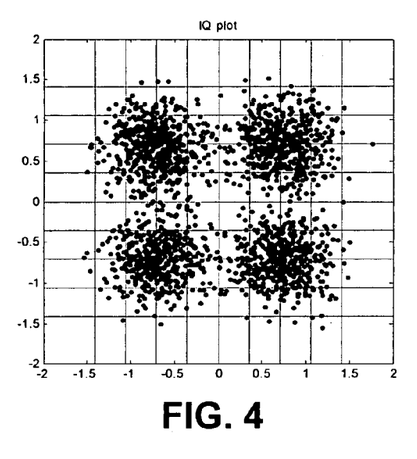
FIG. 4 is an observed signal point constellation for QPSK plotted on an I/Q phasor diagram showing carrier lock at low SNR.

FIG. 4 is a signal point constellation plotted on an I/Q phasor diagram showing carrier lock at low SNR. When the carrier is locked at low SNR, the signal points are loosely dispersed around each of the respective nominal states, rendering detection of carrier lock more difficult.

Figure 5:
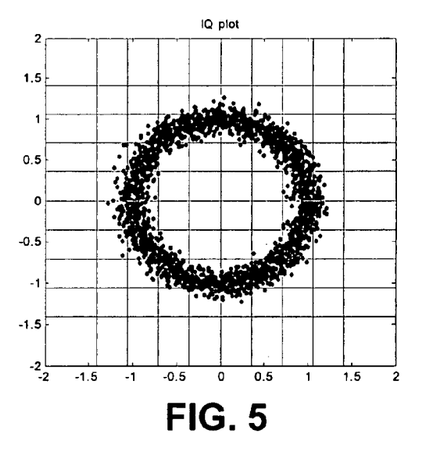
FIG. 5 is an observed signal point constellation for QPSK plotted on an I/Q phasor diagram showing carrier unlocked (or spinning) at high SNR.

FIG. 5 is a signal point constellation plotted on an I/Q phasor diagram showing carrier unlocked (or spinning) at high SNR. When the carrier spins at high SNR, the signal points are tightly clustered in an annular zone centered about the origin of the I/Q plot.

Figure 6:
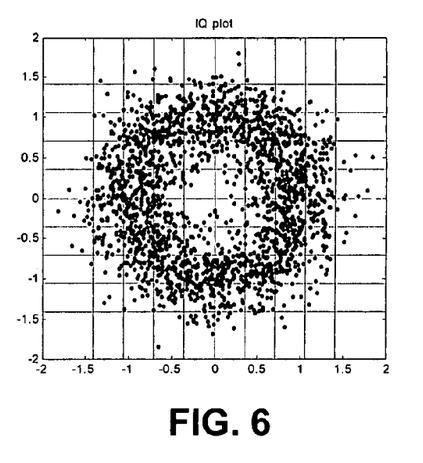
FIG. 6 is an observed signal point constellation for QPSK plotted on an I/Q phasor diagram showing carrier unlocked (or spinning) at low SNR.

FIG. 6 is a signal point constellation plotted on an I/Q phasor diagram showing carrier unlocked (or spinning) at low SNR. When the carrier spins at low SNR, the signal points are dispersed in an annular zone centered about the origin of the I/Q plot, rendering detection of carrier lock more difficult.

Figure 7:
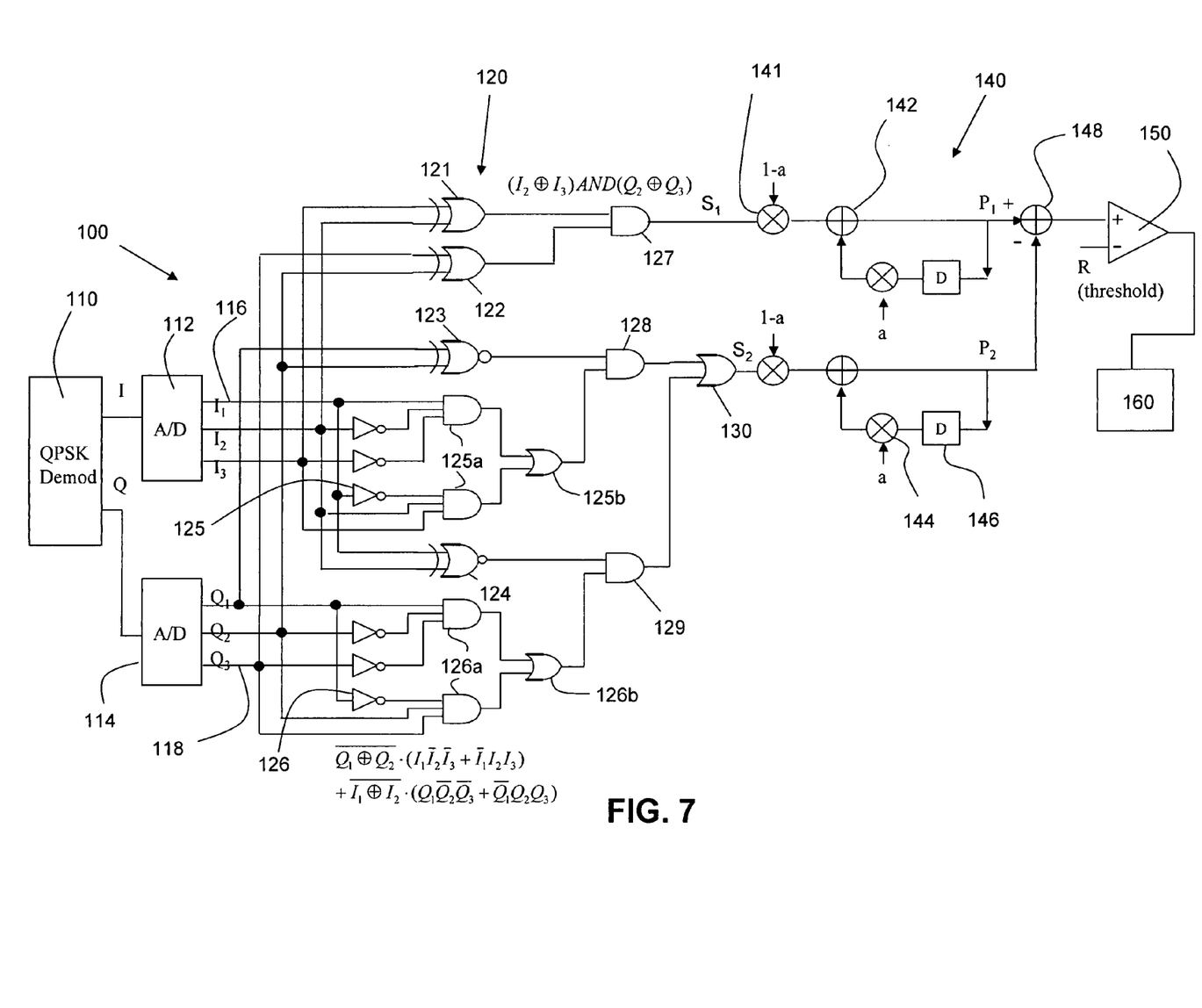
FIG. 7 is a circuit diagram of a carrier lock detector in accordance with a first embodiment of the present invention.

A first embodiment of the carrier lock detector in accordance with the present invention is shown in FIG. 7. A receiver system has a QPSK carrier lock detector 100 which determines carrier lock or carrier unlock based on signals received from an upstream QPSK demodulator 110 and a pair of analog-to-digital converters 112, 114 (also referred to herein as "A/D converters" or "ADCs"). As shown in FIG. 7, a first 3-bit ADC 112 converts analog in-phase components of the demodulated signal into I bits ($I_1$, $I_2$, $I_3$) designated collectively by the reference numeral 116. A second 3-bit ADC 114 converts analog quadrature components of the demodulated signal into Q bits ($Q_1$, $Q_2$, $Q_3$) designated collectively by the reference numeral 118.

The I bits 116 and Q bits 118 are then processed by logic gating 120 of the carrier lock detector 100. In the first embodiment, the logic gating 120 implements the first lock detection algorithm in which the first areas are defined by $(I_2 \oplus I_3) \cdot (Q_2 \oplus Q_3)$ and the second areas are defined by $\overline{Q_1 \oplus Q_2} \cdot (I_1 \overline{I_2} \overline{I_3} + \overline{I_1} I_2 I_3) + (\overline{I_1 \oplus I_2}) \cdot (Q_1 \overline{Q_2 Q_3} + \overline{Q_1} Q_2 Q_3)$. The portion of the logic gating that determines whether a detected signal maps onto one of the first areas constitutes a first counter. The portion of the logic gating that determines whether a detected signal maps onto one of the second areas constitutes a second counter.

As illustrated in FIG. 7, $I_2$ and $I_3$ enter an exclusive-OR (XOR) gate 121 while $Q_2$ and $Q_3$ enter another exclusive-OR (XOR) gate 122. The output of the XOR gates 121, 122 enters an AND gate to produce $(I_2 \oplus I_3) \cdot (Q_2 \oplus Q_3)$, which defines the first areas.

For defining the second areas, $Q_1$ and $Q_2$ are first processed by a NOT-XOR gate 123 while $I_1$, and $I_2$ are processed by another NOT-XOR gate 124. Meanwhile, three NOT gates 125 convert $I_1$, $I_2$ and $I_3$ into $\overline{I_1}$, $\overline{I_2}$ and $\overline{I_3}$, respectively. Likewise, another three NOT gates 126 convert $Q_1$, $Q_2$ and $Q_3$ into $\overline{Q_1}$, $\overline{Q_2}$ and $\overline{Q_3}$. A pair of AND gates 125a produce $I_1 \overline{I_2} \overline{I_3}$ and $\overline{I_1} I_2 I_3$ which are then logically added using an OR gate 125b. Another pair of AND gates 126a produce $Q_1 \overline{Q_2 Q_3}$ and $\overline{Q_1} Q_2 Q_3$ which are then logically added using another OR gate 126b. The outputs of the NOT XOR gate 123 and the OR gate 125b are then logically multiplied using an AND gate 128. Likewise, the outputs of the NOT XOR gate 124 and the OR gate 126b are also logically multiplied using another AND gate 129. Finally, the outputs of the AND gates 128, 129 are logically added using an OR gate 130 to give the final result $\overline{Q_1 \oplus Q_2} \cdot (I_1 \overline{I_2} \overline{I_3} + \overline{I_1} I_2 I_3) + (\overline{I_1 \oplus I_2}) \cdot (Q_1 \overline{Q_2 Q_3} + \overline{Q_1} Q_2 Q_3)$.

Every time a detected signal maps onto one of the first areas, a first signal ($S_1$) is generated. Likewise, every time a detected signal maps onto one of the second areas, a second signal ($S_2$) is generated. A pair of digital filters 140 keeps a running average of S1 and S2. The running averages of $S_1$ and $S_2$ are denoted $P_1$ and $P_2$. The value of $P_1$ represents the probability that the detected signals are mapping onto one of the first areas, where the signals are most likely to fall into when the carrier is locked. The value of $P_2$ represents the probability that the detected signals are mapping onto one of the second areas. Note that when carrier is not locked, the signals fall into the $1^{st}$ and $2^{nd}$ areas with approximately equal probability, i.e., $P_1-P_2$ would be small. When carrier is locked, $P_1-P_2$ is large. Thus, $P_1-P_2$ can be used as a good indication of carrier 'lock' or 'out-of-lock'.

The sensitivity of the digital filters 140 can be adjusted by changing the value of a, where $1/(1-a)$ is proportional to the number of symbols over which the running average is computed. For example, if a =0.999, then the running average will be computed over approximately 4000 symbols. Depending upon the system requirement, the value of a can be adjusted accordingly. For example, if a longer average is desired, a can be set larger (still <1).

As noted above, the probabilities $P_1$ and $P_2$ are computed as running averages. $P_1$ is continually updated according the formula $P_1 \rightarrow (1-a)S_1 + aP_1$. Analogously, $P_2$ is continually updated according the formula $P_2 \rightarrow (1-a)S_2 + aP_2$.

Each digital filter 140 has a multiplier 141 which multiplies the first and second signals ($S_1$ and $S_2$, respectively) by $(1-a)$ to produce $(1-a)S_1$, and $(1-a)S_2$, respectively. An adder 142 adds $(1-a)S_1$ and $(1-a)S_2$ to $aP_1$, and $aP_2$, respectively. A multiplier 144 on each digital filter produces $aP_1$, and $aP_2$. Each filter 140 also has a delay element 146 (labeled D in the figure) equal to the symbol interval. For example, if the symbol rate is 10 GHz, the symbol interval would be 100 ps, and thus D=100 ps.

A probability difference ($P_1-P_2$) is computed by a logic device having a subtracting means 148. A comparator 150 compares ($P_1-P_2$) with a value R, which represents the threshold probability. If $P_1-P_2 > R$, then a carrier lock detection signal is generated in the form of a binary 1 to indicate carrier lock. If $P_1-P_2 < R$, then a binary 0 is generated to indicate carrier spinning, or carrier unlocked. The carrier lock detection signal can be used to enable and disable a decoder 160. For QPSK and 4-QAM, the threshold R can be set to 0.3, which provides superior discrimination between signals mapping into the first areas and those mapping onto the second areas. The threshold comparator 150 can also be constructed to account for hysteresis, in which two thresholds are used, e.g., one at 0.35 and the other at 0.25.

Figure 8:
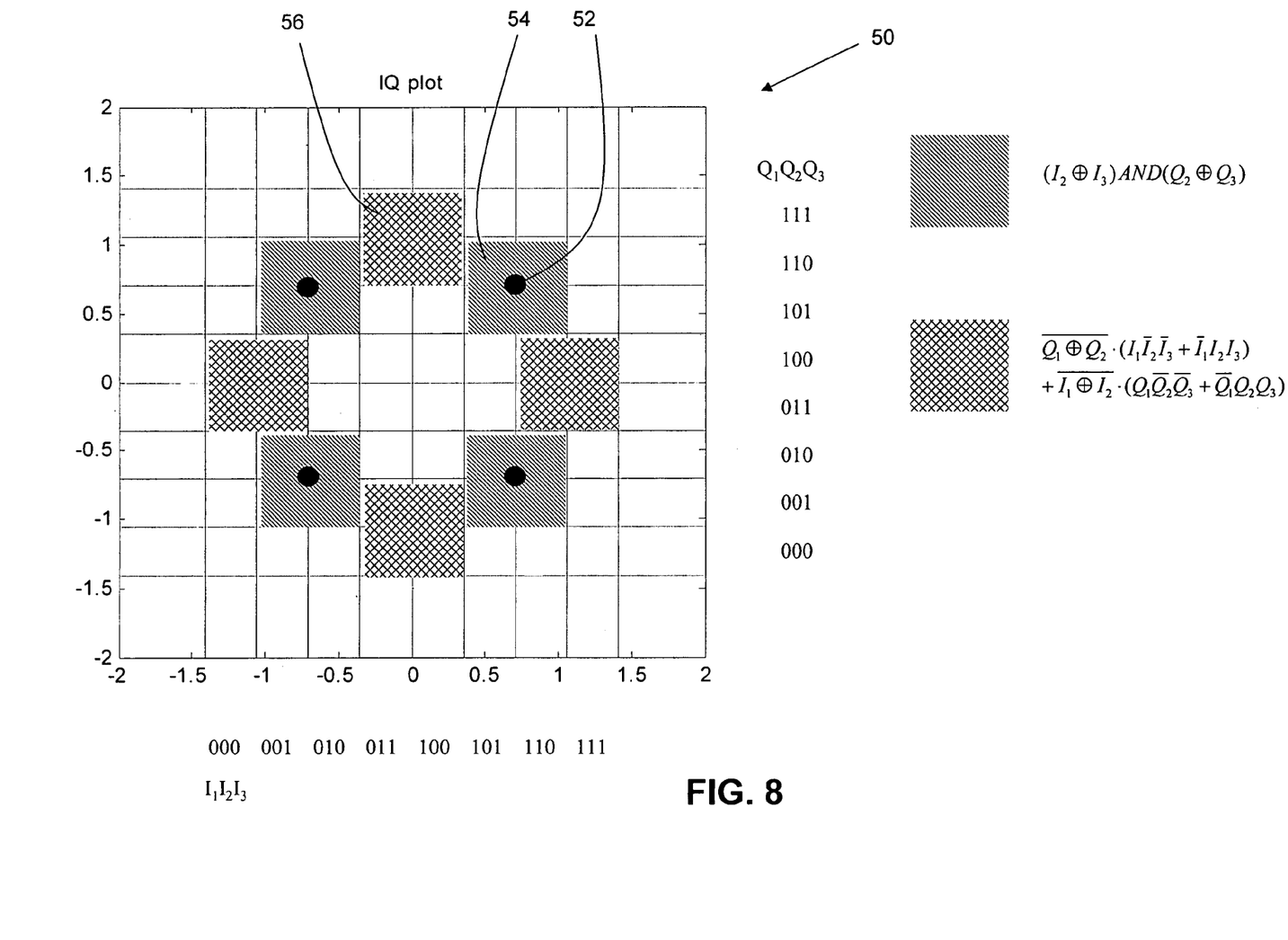
FIG. 8 is an I/Q plot of a first lock detection algorithm in accordance with the first embodiment of the present invention.

FIG. 8 is an I/Q plot 50 of the first lock detection algorithm in accordance with the first embodiment of the present invention. The I/Q plot 50 has four nominal states 52. Centered on each of the four nominal states 52 is a first area 54 defined logically by $(I_2 \oplus I_3) \cdot (Q_2 \oplus Q_3)$. Adjacent to the first areas 54 are four second areas 56 which are defined by $\overline{Q_1 \oplus Q_2} \cdot (I_1 \overline{I_2 I_3} + \overline{I_1} I_2 I_3) + (\overline{I_1 \oplus I_2}) \cdot (Q_1 \overline{Q_2 Q_3} + \overline{Q_1} Q_2 Q_3)$.

Figure 9:
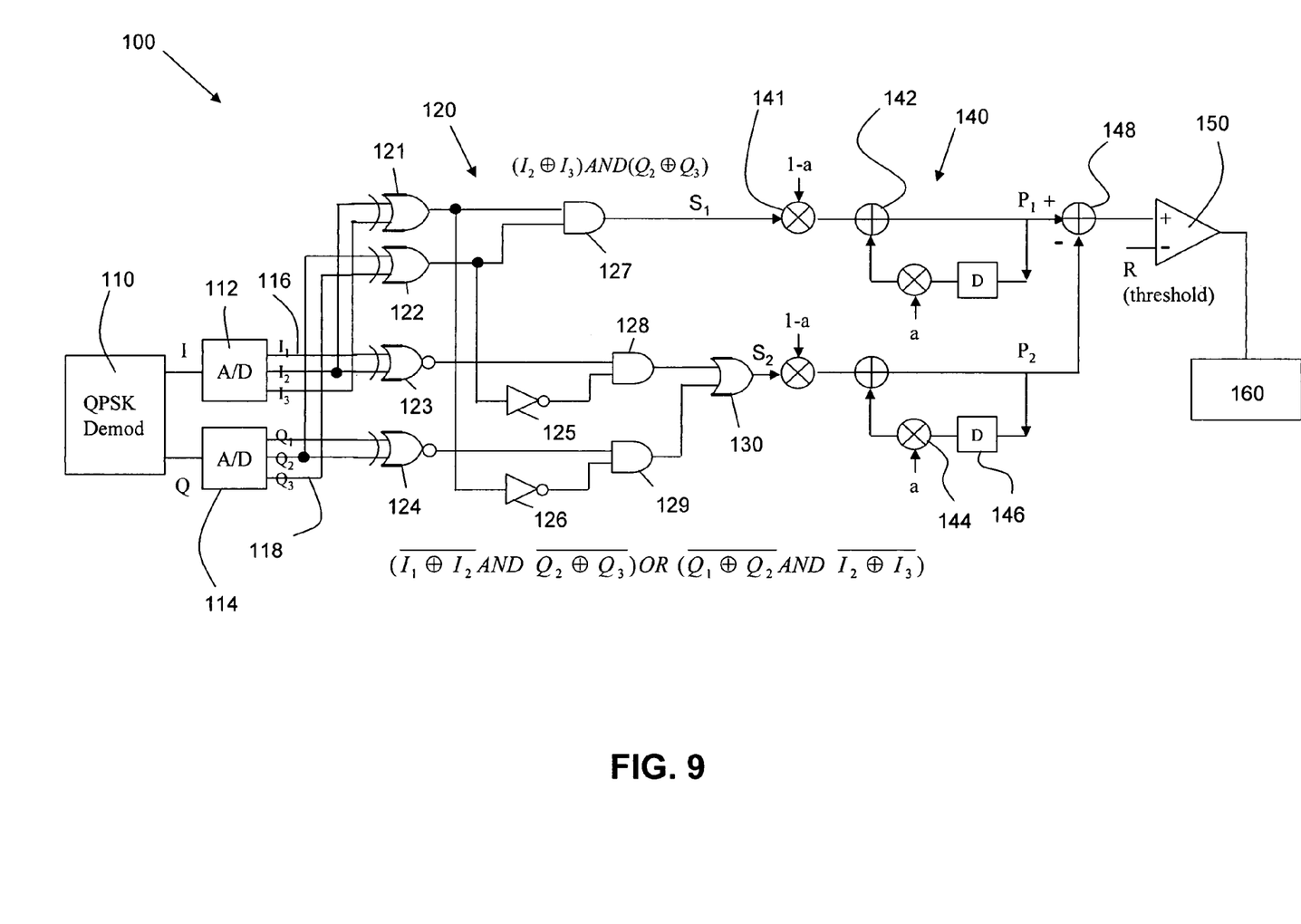
FIG. 9 is a circuit diagram of a carrier lock detector in accordance with a second embodiment of the present invention.

A second embodiment of the carrier lock detector in accordance with the present invention is shown in FIG. 9. A receiver system has a QPSK carrier lock detector 100 which determines carrier lock or carrier unlock based on signals received from an upstream QPSK demodulator 110 and a pair of analog-to-digital converters 112, 114. As shown in FIG. 9, a first 3-bit ADC 112 converts analog in-phase components of the demodulated signal into I bits ($I_1$, $I_2$, $I_3$) designated collectively by the reference numeral 116. A second 3-bit ADC 114 converts analog quadrature components of the demodulated signal into Q bits ($Q_1$, $Q_2$, $Q_3$) designated collectively by the reference numeral 118.

The I bits 116 and Q bits 118 are then processed by logic gating 120 of the carrier lock detector 100. In the second embodiment, the logic gating 120 implements the second lock detection algorithm whereby the first areas are defined by $(I_2 \oplus I_3) \cdot (Q_2 \oplus Q_3)$ and the second areas are defined by $(\overline{I_1 \oplus I_2} \cdot \overline{Q_2 \oplus Q_3}) + (\overline{Q_1 \oplus Q_2} \cdot \overline{I_2 \oplus I_3})$. The portion of the logic gating that determines whether a detected signal maps onto one of the first areas constitutes a first counter. The portion of the logic gating that determines whether a detected signal maps onto one of the second areas constitutes a second counter.

As illustrated in FIG. 9, $I_2$ and $I_3$ enter an exclusive-OR (XOR) gate 121 while $Q_2$ and $Q_3$ enter another exclusive-OR (XOR) gate 122. The output of the XOR gates 121, 122 enters an AND gate to produce $(I_2 \oplus I_3) \cdot (Q_2 \oplus Q_3)$, which defines the first areas.

For defining the second areas, $I_1$, and $I_2$ are first processed by a NOT-XOR gate 123 while $Q_1$ and $Q_2$ are processed by another NOT-XOR gate 124. Meanwhile, the output of the XOR gate 121 is processed by a NOT gate 126 while the output of the XOR gate 122 is processed by another NOT gate 125. The output of the NOT gate 125 is logically multiplied by the output of the NOT XOR gate 123 using an AND gate 128. The output of the NOT gate 126 is logically multiplied by the output of the NOT XOR gate 124 using another AND gate 129. The outputs of the AND gates 128, 129 are then logically added using an OR gate 130 to give the final result $(\overline{I_1 \oplus I_2} \cdot \overline{Q_2 \oplus Q_3}) + (\overline{Q_1 \oplus Q_2} \cdot \overline{I_2 \oplus I_3})$.

As described above with reference to the first embodiment, every time a detected signal maps onto one of the first areas, a first signal ($S_1$) is generated. Likewise, every time a detected signal maps onto one of the second areas, a second signal ($S_2$) is generated. A pair of digital filters 140 keeps a running average of S1 and S2. The running averages of $S_1$ and $S_2$ are denoted $P_1$ and $P_2$. The value of $P_1$ represents the probability that the detected signals are mapping onto one of the first areas, where the signals are most likely to fall into when the carrier is locked. The value of $P_2$ represents the probability that the detected signals-are mapping onto one of the second areas. Note that when carrier is not locked, the signals fall into the $1^{st}$ and $2^{nd}$ areas with approximately equal probability, i.e., $P_1 - P_2$ would be small. When carrier is locked, $P_1 - P_2$ is large. Thus, $P_1 - P_2$ can be used as a good indication of carrier 'lock' or 'out-of-lock'.

The sensitivity of the digital filters 140 can be adjusted by changing the value of a, where $1/(1-a)$ is proportional to the number of symbols over which the running average is computed. For example, if a =0.999, then the running average will be computed over approximately 4000 symbols. Depending upon the system requirement, the value of a can be adjusted accordingly. For example, if a longer average is desired, a can be set larger (still <1).

As noted above, the probabilities $P_1$ and $P_2$ are computed as running averages. $P_1$ is continuously updated according the formula $P_1 \rightarrow (1-a)S_1 + aP_1$. Analogously, $P_2$ is continuously updated according the formula $P_2 \rightarrow (1-a)S_2 + aP_2$.

Each digital filter 140 has a multiplier 141, which multiplies the first and second signals ($S_1$ and $S_2$, respectively) by $(1-a)$ to produce $(1-a)S_1$, and $(1-a)S_2$, respectively. An adder 142 adds $(1-a)S_1$ and $(1-a)S_2$ to derive $aP_1$, and $aP_2$, respectively. A multiplier 144 on each digital filter outputs $aP_1$, and $aP_2$. Each filter 140 also has a delay element 146 (labeled D in the figure) equal to the symbol interval. For example, if the symbol rate is 10 GHz, the symbol interval would be 100 ps, and thus D=100 ps.

A probability difference $(P_1 - P_2)$ is computed by a logic circuit 148. A comparator 150 compares $(P_1 - P_2)$ with a value R, which represents the threshold probability. If $P_1 - P_2 > R$, then a carrier lock detection signal is generated in the form of a binary 1 to indicate carrier lock. If $P_1 - P_2 < R$, then a binary 0 is generated to indicate carrier spinning, or carrier unlocked. The carrier lock detection signal can be used to enable and disable a decoder 160. For QPSK and 4-QAM, the threshold R can be set to 0.3, which provides superior discrimination between signals mapping into the first areas and those mapping onto the second areas. The threshold comparator 150 can also be constructed to account for hysteresis.

Figure 10:
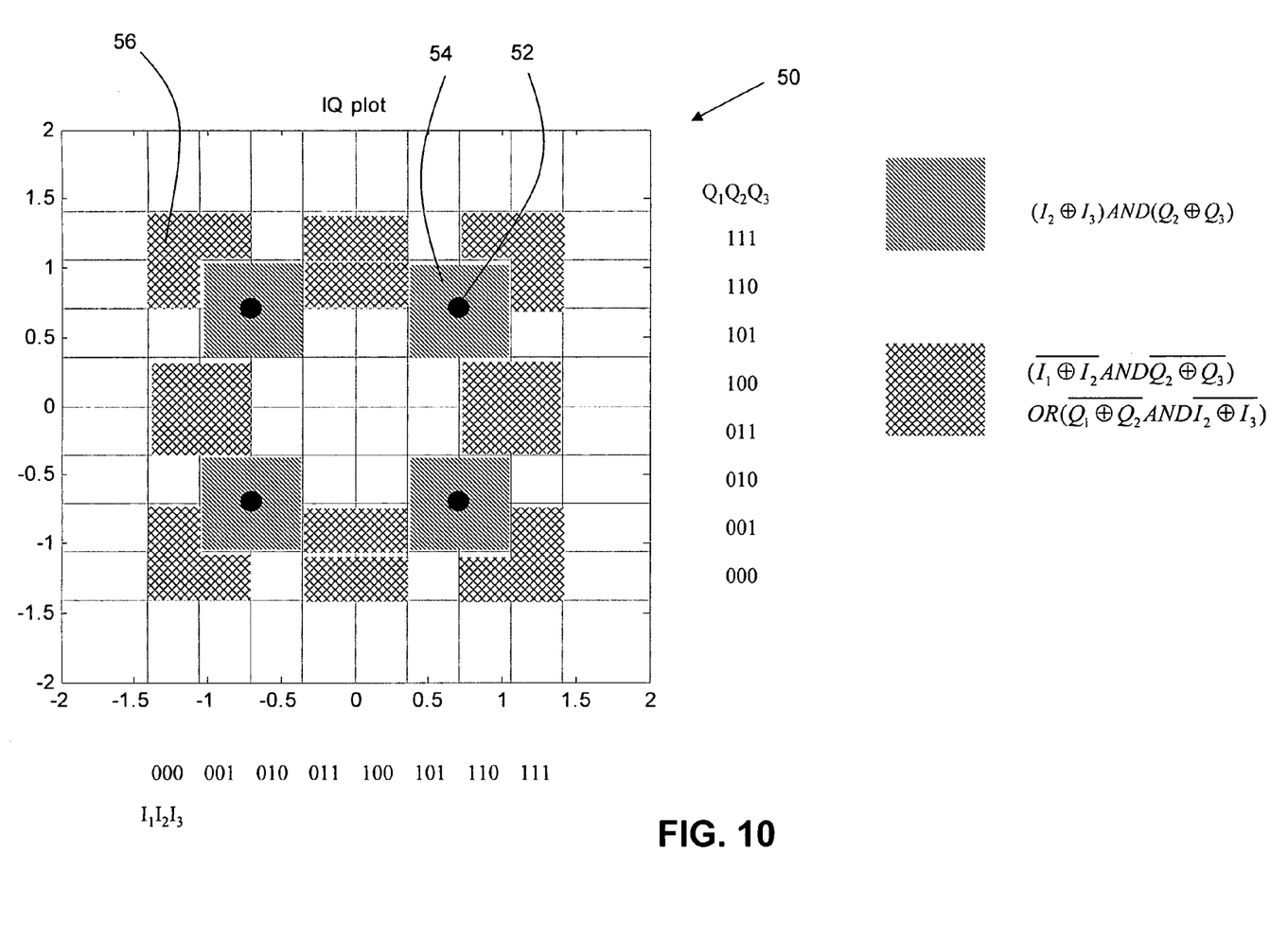
FIG. 10 is an I/Q plot of a second lock detection algorithm in accordance with the second embodiment of the present invention.

FIG. 10 is an I/Q plot 50 of the second lock detection algorithm in accordance with the second embodiment of the present invention. The I/Q plot 50 has four nominal states 52. Centered on each of the four nominal states 52 is a first area 54 defined logically by $(I_2 \oplus I_3) \cdot (Q_2 \oplus Q_3)$. Adjacent to the first areas 54 are eight second areas 56 which are defined by $(\overline{I_1 \oplus I_2} \cdot \overline{Q_2 \oplus Q_3}) + (\overline{Q_1 \oplus Q_2} \cdot \overline{I_2 \oplus I_3})$.

Figure 11:
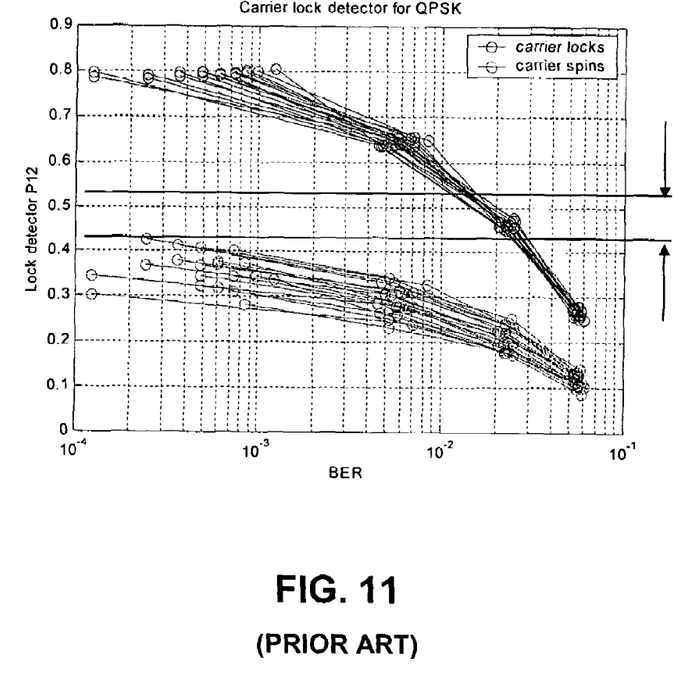
FIG. 11 is a graph of probability difference ($P_{12}$) versus bit-error rate (BER) for a prior-art lock detection algorithm implemented on a QPSK or 4-QAM system.
Figure 12:
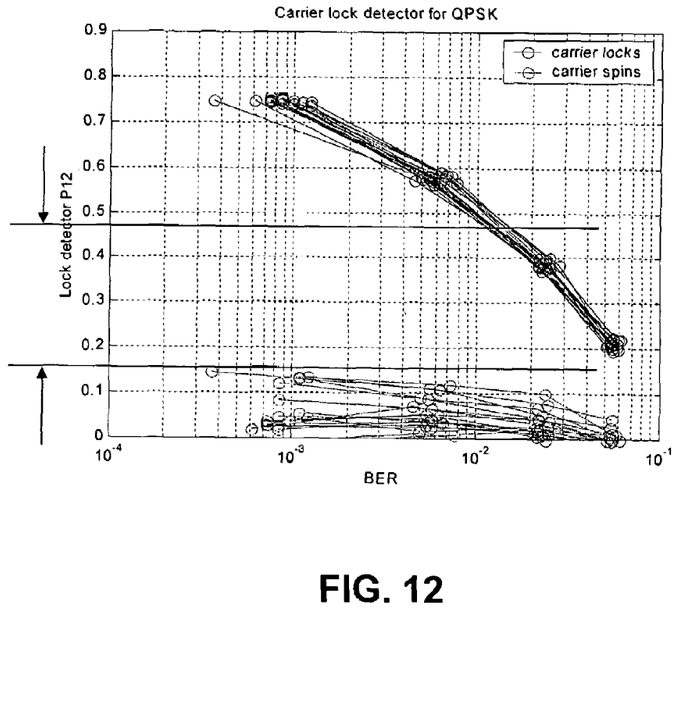
FIG. 12 is a graph of probability difference ($P_{12}$) versus bit-error rate (BER) for the first lock detection algorithm in accordance with the first embodiment of the present invention.
Figure 13:
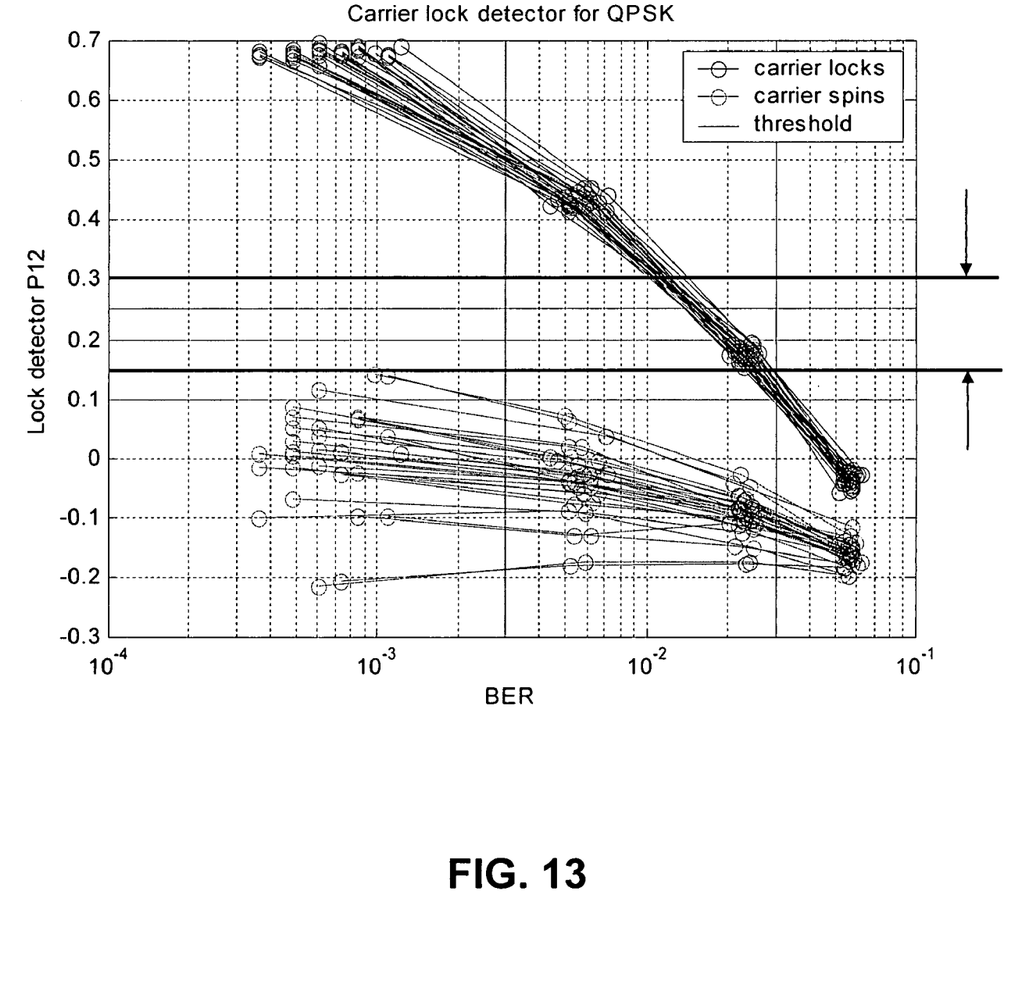
FIG. 13 is a graph of probability difference ($P_{12}$) versus bit-error rate (BER) for the second lock detection algorithm in accordance with the second embodiment of the present invention.

As illustrated in FIGS. 11-13, for QPSK or 4-QAM, the first and second algorithms of this invention provide better discrimination or separation (i.e. a higher $P_{12}$ for a given BER) than the prior-art algorithm. Empirical data was collected using a coherent optical transmitter (Tx laser) and a coherent optical receiver (Rx laser) running at a linewidth of 2.5 MHz each and 4096 symbols.

FIG. 11 is a plot of probability difference $(P_{12})$ versus raw bit-error rate (BER) for a QPSK or 4-QAM system using the prior-art algorithm. The difference in probability at a BER of 0.01 is $P_{12} = 0.53 - 0.42 = 0.11$, which is quite low. Thus, at a raw bit-error rate of 0.01, the ability to discern between carrier 'lock' and 'out-of-lock' is tenuous. As noted above, the prior-art algorithm does not work reliably when applied to a QPSK or 4-QAM system at high raw BER (or, low SNR).

FIG. 12 is a plot of probability difference $(P_{12})$ versus raw bit-error rate (BER) for a QPSK or a 4-QAM system using the first algorithm in accordance with the first embodiment of the invention. The difference in probability at a BER of 0.01 is $P_{12} = 0.47 - 0.15 = 0.32$. Thus, the first algorithm of the present invention when applied to QPSK and 4-QAM provides three times better discrimination than the prior-art algorithm. In other words, the ability of the carrier lock detector to discern locked from unlocked states has been improved threefold. Conversely, for a given probability difference (for the purposes of comparing with a preset probability threshold), the first algorithm in accordance with the invention will provide the same separation or discrimination up to a much higher BER. For example, for a probability separation of $P_{12}=0.11$, the first algorithm will function correctly up to a BER of 0.04, which represents a fourfold increase in BER tolerance.

FIG. 13 is a plot of probability difference ($P_{12}$) versus raw bit-error rate (BER) for a QPSK or a 4-QAM system using the algorithm in accordance with the second embodiment of the invention. The difference in probability at a BER of 0.01 is $P_{12}=0.30-0.15=0.15$. This represents approximately a 40% increase in separation. While the second algorithm is not as discriminating as the first algorithm, its logic is somewhat simpler to implement.

Figure 14:
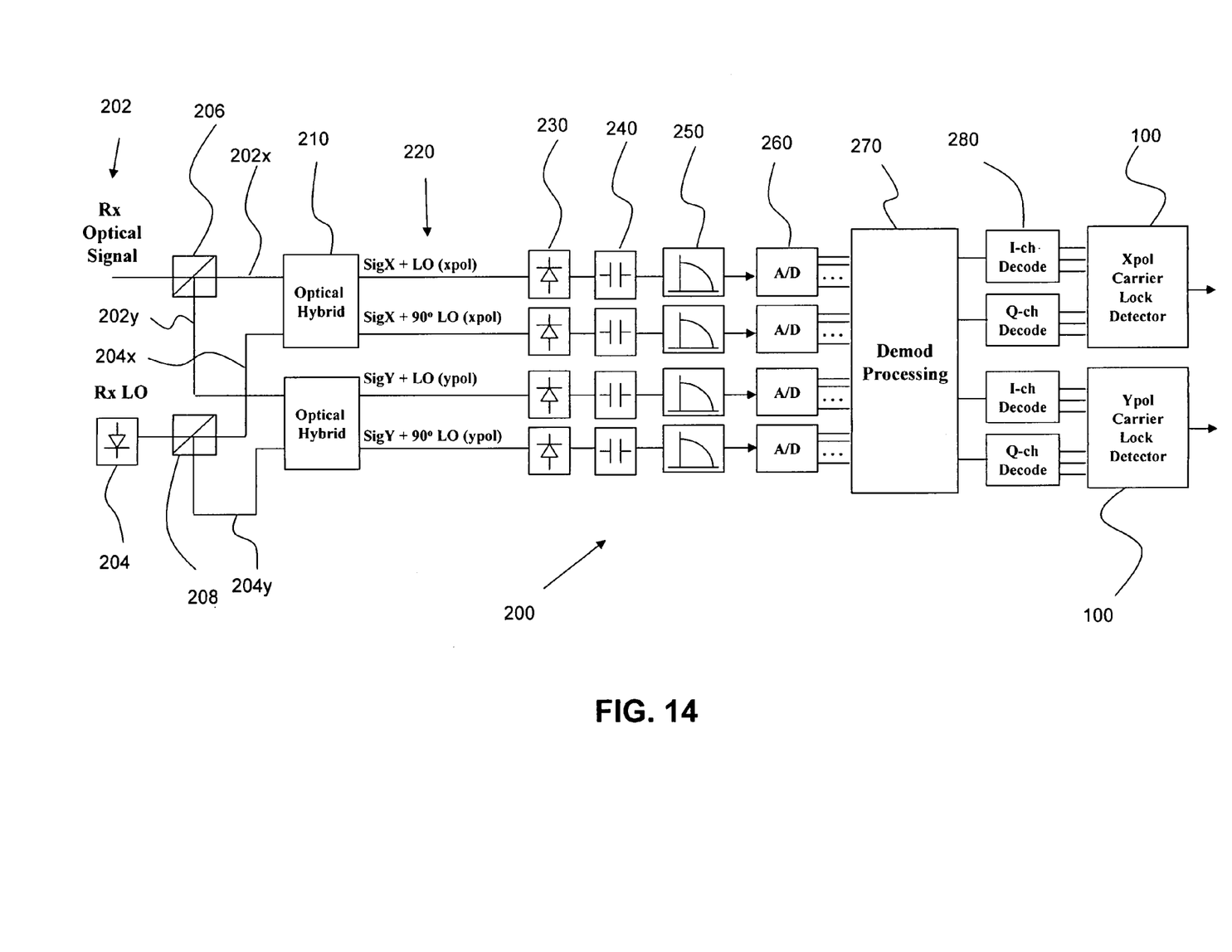
FIG. 14 is a block diagram of an optical coherent receiver having x-pol and y-pol carrier lock detectors in accordance with an embodiment of the present invention.

FIG. 14 is a block diagram of an optical coherent receiver 200 having a pair of carrier lock detectors 100 in accordance with either one of the embodiments of this invention. As persons skilled in the art will appreciate, the carrier lock detector may also be incorporated into a coherent receiver for RF, microwave or other types of communication systems.

The optical coherent receiver 200 shown in FIG. 14 receives an optical signal 202 having a carrier frequency. A local oscillator 204, which is typically a laser, generates a local signal at a frequency different from that of the carrier frequency. As will be explained below, the received optical signal is combined, or "beat", with the local signal to produce an intermediate signal having an intermediate frequency, or a "beat frequency", equal to a difference between the carrier frequency (the frequency of the incoming signal) and the frequency of the local oscillator.

The incoming signal 202 is split into orthogonal components (designated as an x-polarized incoming signal 202x and y-polarized incoming signal 202y) using a first polarization beam splitter (PBS) 206. Likewise, a second PBS 208 is used to split the local signal 204 into orthogonal components, i.e., an x-polarized local signal 204x and a y-polarized local signal 204y. The x-polarized and y-polarized components of the incoming signal and local oscillator signal enter a pair of optical hybrids 210, which act as couplers, and emerge as four mixed signals 220 as shown in FIG. 14. The x-polarized incoming signal 202x (which is designated as SigX in FIG. 14) is mixed with the x-polarized local oscillator signal (designated as LO(xpol) in FIG. 14). The x-polarized incoming signal 202x is also mixed with a 90° phase-shifted x-polarized local oscillator signal, designated 90° LO (xpol).

Likewise, the y-polarized incoming signal 202y is mixed with the y-polarized local oscillator signal 204y (designated at SigY and LO(ypol), respectively in FIG. 14). The y-polarized incoming signal 202y is also mixed with a 90° phase-shifted y-polarized local oscillator signal, designated 90° LO (ypol).

Each of these four mixed signals is carried on a separate channel as shown in FIG. 14. Each of these four mixed signals is then detected by a respective PIN diode 230 (which is a photodetector well known in the art). The PIN diode is a "square-law detector" producing an electrical signal proportional to the square of the intensity of the light impinging on the PIN diode.

The optical coherent receiver 200 also has four filters. As illustrated in FIG. 14, each of the four channels is filtered by an AC coupling 240 and a low-pass filter (LPF) 250. The LPF 250 removes high-frequency components and the AC coupling removes DC.

The four filtered analog signals are then converted to digital with four analog-to-digital converters 260. A digital demodulator 270 demodulates the signals on each of the four channels in the digital domain. Four channels are output from the digital demodulator which are then decoded using two sets of I-channel and Q-channel decoders 280, one set corresponding to x-polarization, the other corresponding to y-polarization. The outputs of these four decoders are then fed into an x-polarization carrier lock detector 100 and a y-polarization carrier lock detector 100 (having the components and functionality as described above). Each carrier lock detector 100 determines whether the carrier signal is locked or spinning and provides a feedback signal to enable (or disable) the respective set of decoders.

For optical coherent receivers, both homodyne and heterodyne detection may be used.

Not only can the carrier lock detector and associated method of detecting carrier lock be used in an optical coherent receiver, it can also be used for wireless (microwave or RF) or conventional landline networks.

While the lock detector described herein is most relevant in the context of long-haul and metro trunk systems, it can also be used for shorter range networks as well.

Persons skilled in the art will appreciate that rather than implementing the algorithms via logic gating, the algorithms can be implemented using RAM and a lookup table. It should also be apparent that other combinations of logic operators can be used to implement these two algorithms. The embodiments of the invention described above are thus intended to be exemplary only. The scope of the invention is therefore intended to be limited solely by the scope of the appended claims.

We claim:

1. A carrier lock detector for use with a QPSK or low-level QAM system having a constellation of signal points identified by a plurality of I bits and Q bits respectively representing in-phase and quadrature components in a phasor diagram, the phasor diagram including a plurality of first areas centered on ideal signal points representing nominal states and a plurality of second areas adjacent to the first areas, the detector comprising:

a first counter responsive to a plurality of I bits and Q bits, the first counter producing a first output signal when a detected signal has I and Q components that map a signal point onto one of the first areas;

a second counter responsive to a plurality of I bits and Q bits, the second counter producing a second output signal when a detected signal has I and Q components that map a signal point onto one of the second areas; and a logic device for generating a carrier lock detection signal using the first and second output signals;

wherein the first areas are defined by $(I_2 \oplus I_3) \cdot (Q_2 \oplus Q_3)$ and the second areas are defined by either one of $\overline{Q_1 \oplus Q_2} \cdot (I_1 \overline{I_2} I_3 + \overline{I_1} I_2 I_3) + (\overline{I_1 \oplus I_2}) \cdot (Q_1 \overline{Q_2 Q_3} + \overline{Q_1} Q_2 Q_3)$ and $(\overline{I_1 \oplus I_2} \cdot \overline{Q_2 \oplus Q_3}) + (\overline{Q_1 \oplus Q_2} \cdot \overline{I_2 \oplus I_3})$.

2. The carrier lock detector as claimed in claim 1, wherein the logic device comprises:

a first digital filter connected to receive the first output signal, for generating a respective first average signal P1 indicative of a probability that the detected signals map onto one of the first areas;

a second digital filter connected to receive the second output signal, for generating a respective second average signal P2 indicative of a probability that the detected signals map onto one of the second areas;

a digital adder/subtractor for computing a difference between the first and second average signals; and a threshold comparator for comparing the subtraction result to a predetermined threshold, and for generating the cater lock detection signal based on the comparison result.

3. The carrier lock detector as claimed in claim 2, wherein each of the first and second average signals P1 and P2 is a running average computed over a predetermined number of samples of the first and second output signals, respectively.

4. A coherent receiver with a carrier lock detector for use with a QPSK or low-level QAM system having a constellation of signal points identified by a plurality of I bits and Q bits respectively representing in-phase and quadrature components in a phasor diagram, the phasor diagram including a plurality of first areas centered on ideal signal points representing nominal states and a plurality of second areas adjacent to the first areas, comprising:

a first counter responsive to a plurality of I bits and Q bits, the first counter producing a first output signal when a detected signal has I and Q components that map a signal point onto one of the first areas;

a second counter responsive to a plurality of I bits and Q bits, the second counter producing a second output signal when a detected signal has I and Q components that map a signal point onto one of the second areas; and a logic device for generating a carrier lock detection signal using the first and second output signals;

wherein the first areas are defined by $(I_2 \oplus I_3) \cdot (Q_2 \oplus Q_3)$ and the second areas are defined by either one of $\overline{Q_1 \oplus Q_2} \cdot (I_1 \overline{I_2 I_3} + \overline{I_1} I_2 I_3) + (\overline{I_1 \oplus I_2}) \cdot (Q_1 \overline{Q_2 Q_3} + \overline{Q_1} Q_2 Q_3)$ and $(\overline{I_1 \oplus I_2} \cdot \overline{Q_2 \oplus Q_3}) + (\overline{Q_1 \oplus Q_2} \cdot \overline{I_2 \oplus I_3})$.

5. The coherent receiver as claimed in claim 4, further comprising:

a local oscillator for generating a local signal having a local frequency different from that of a received signal;

a coupler for combining the incoming signal with the local signal to produce an intermediate signal;

a detector for detecting the intermediate signal;

a filter for filtering the intermediate signal;

a demodulator for separating the intermediate signal into analog I and Q components;

a first analog-to-digital converter for converting the analog I components into I bits; and a second analog-to-digital converter for converting the analog Q components into Q bits.

6. The coherent receiver as claimed in claim 5 wherein the first analog-to-digital converter is a 3-bit analog-to-digital converter for decoding I bits designated as $I_1$, $I_2$, $I_3$, where $I_1$ is the most significant I bit; and the second analog-to-digital converter is a 3-bit analog-to-digital converter for decoding Q bits designated as $Q_1$, $Q_2$, $Q_3$, where $Q_1$ is the most significant Q bit.

7. The coherent receiver as claimed in claim 5 wherein the local oscillator comprises a laser.

8. The coherent receiver as claimed in claim 5 wherein the detector comprises a photodiode.

9. The coherent receiver as claimed in claim 5 wherein the filter comprises a low-pass filter.

10. The coherent receiver as claimed in claim 5 wherein the coupler is an optical hybrid.

11. The coherent receiver as claimed in claim 4, wherein the logic device comprises:

a first digital filter connected to receive the first output signal, for generating a respective first average signal P1 indicative of a probability that the detected signals map onto one of the first areas;

a second digital filter connected to receive the second output signal, for generating a respective second average signal P2 indicative of a probability that the detected signals map onto one of the second areas;

a digital adder/subtractor for computing a difference between the first and second average signals; and a threshold comparator for comparing the subtraction result to a predetermined threshold, and for generating the carrier lock detection signal based on the comparison result.

12. The coherent receiver as claimed in claim 11, wherein each of the first and second average signals P1 and P2 is a running average computed over a predetermined number of samples of the first and second output signals, respectively.

13. The method as claimed in claim 12, wherein the steps of computing the first and second average signals P1 and P2 comprise computing respective running averages over a predetermined number of symbols of the first and second output signals, respectively.

14. A method of detecting carrier lock in a QPSK or low-level QAM system having a constellation of signal points identified by a plurality of I bits and Q bits respectively representing in-phase and quadrature components in a phasor diagram, the phasor diagram including a plurality of first areas centered on ideal signal points representing nominal states and a plurality of second areas adjacent to the first areas, the method comprising the steps of:

monitoring a plurality of less significant I and Q bits;

generating a first signal when a detected received signal has I and Q components that map onto one of the first areas;

generating a second signal when the detected received signal has I and Q components that map onto one of the second areas; and generating a carrier lock detection signal based on the first and second signals;

wherein the first areas are defined by $(I_2 \oplus I_3) \cdot (Q_2 \oplus Q_3)$ and the second areas are defined by either one of $\overline{Q_1 \oplus Q_2} \cdot (I_1 \overline{I_2 I_3} + \overline{I_1} I_2 I_3) + (\overline{I_1 \oplus I_2}) \cdot (Q_1 \overline{Q_2 Q_3} + \overline{Q_1} Q_2 Q_3)$ and $(\overline{I_1 \oplus I_2} \cdot \overline{Q_2 \oplus Q_3}) + (\overline{Q_1 \oplus Q_2} \cdot \overline{I_2 \oplus I_3})$.

15. The method as claimed in claim 14, wherein the step of generating the carrier lock detection signal comprises steps of:

computing a first average signal P1 indicative of a probability that the detected signals map onto one of the first areas;

computing a second average signal P2 indicative of a probability that the detected signals map onto one of the second areas computing a difference between the first and second average signals;

comparing the difference with a threshold value; and generating the carrier lock detection signal based on the detection result.

* * * * *